United States Patent
Park et al.

(10) Patent No.: US 11,994,768 B2
(45) Date of Patent: May 28, 2024

(54) LIGHTING APPARATUS

(71) Applicant: LG Innotek Co., Ltd., Seoul (KR)

(72) Inventors: Kwang Ho Park, Seoul (KR); Chul Hong Kim, Seoul (KR); Moo Ryong Park, Seoul (KR); Byoung Eon Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/366,040

(22) Filed: Aug. 7, 2023

(65) Prior Publication Data

US 2023/0375877 A1 Nov. 23, 2023

Related U.S. Application Data

(63) Continuation of application No. 18/158,701, filed on Jan. 24, 2023, now Pat. No. 11,754,877, which is a
(Continued)

(30) Foreign Application Priority Data

Apr. 4, 2011 (KR) .................. 10-2011-0030697
Jul. 15, 2011 (KR) .................. 10-2011-0070270
(Continued)

(51) Int. Cl.
*F21K 9/61* (2016.01)
*G02F 1/13357* (2006.01)
(Continued)

(52) U.S. Cl.
CPC .......... *G02F 1/133603* (2013.01); *F21K 9/61* (2016.08); *G02F 1/133605* (2013.01);
(Continued)

(58) Field of Classification Search
CPC ......... G02F 1/133603; G02F 1/133605; F21K 9/61; F21Y 2115/10
See application file for complete search history.

(56) References Cited

U.S. PATENT DOCUMENTS 7,161,644 B2    1/2007  Kim et al.
8,167,445 B2    5/2012  Lee et al.
(Continued)

FOREIGN PATENT DOCUMENTS

CN    101192601 A    6/2008
CN    101321986 A    12/2008
(Continued)

OTHER PUBLICATIONS

International Search Report in International Application No. PCT/KR2012/002532, filed Apr. 4, 2012.
(Continued)

*Primary Examiner* — Evan P Dzierzynski
(74) *Attorney, Agent, or Firm* — Saliwanchik, Lloyd & Eisenschenk

(57) ABSTRACT

The present invention relates to a lighting apparatus using LEDs as light sources and a display using the lighting apparatus, particularly, the present invention provides a lighting apparatus including: a plurality of light sources located on a printed circuit board; and a reflecting unit provided on the printed circuit board; and a spaced area provided inside the reflective unit.

6 Claims, 6 Drawing Sheets

Related U.S. Application Data continuation of application No. 17/646,642, filed on Dec. 30, 2021, now Pat. No. 11,586,069, which is a continuation of application No. 16/950,412, filed on Nov. 17, 2020, now Pat. No. 11,243,428, which is a continuation of application No. 16/165,536, filed on Oct. 19, 2018, now Pat. No. 10,877,313, which is a continuation of application No. 15/965,211, filed on Apr. 27, 2018, now Pat. No. 10,139,054, which is a continuation of application No. 15/056,068, filed on Feb. 29, 2016, now Pat. No. 9,982,849, which is a continuation of application No. 14/110,084, filed as application No. PCT/KR2012/002532 on Apr. 4, 2012, now Pat. No. 9,279,546.

(30) Foreign Application Priority Data

Feb. 21, 2012 (KR) .................. 10-2012-0017280
Feb. 21, 2012 (KR) .................. 10-2012-0017282

(51) Int. Cl.
B32B 27/36  (2006.01)
F21Y 115/10  (2016.01)

(52) U.S. Cl.
CPC ......... *B32B 27/36* (2013.01); *B32B 2307/416* (2013.01); *B32B 2457/202* (2013.01); *F21Y 2115/10* (2016.08)

(56) References Cited

U.S. PATENT DOCUMENTS

| | | | |
|---|---|---|---|
| 8,408,738 | B2 | 4/2013 | Kim et al. |
| 8,675,151 | B2 | 3/2014 | Choi et al. |
| 10,877,313 | B2 | 10/2020 | Park et al. |
| 2001/0002164 | A1 | 5/2001 | Ludwing et al. |
| 2002/0196628 | A1 | 12/2002 | Yoshida et al. |
| 2003/0096067 | A1 | 5/2003 | Hirose |
| 2003/0142247 | A1 | 7/2003 | Nishiyama et al. |
| 2004/0062027 | A1 | 4/2004 | Kim et al. |
| 2004/0227871 | A1* | 11/2004 | Wu ................ G02F 1/1336 349/64 |
| 2006/0268579 | A1 | 11/2006 | Han et al. |
| 2006/0290840 | A1 | 12/2006 | Bang et al. |
| 2007/0019394 | A1 | 1/2007 | Park et al. |
| 2007/0211205 | A1 | 9/2007 | Shibata |
| 2008/0055931 | A1 | 3/2008 | Verstraete et al. |
| 2008/0128739 | A1 | 6/2008 | Sanpei et al. |
| 2009/0059619 | A1 | 3/2009 | Uemoto |
| 2009/0091920 | A1 | 4/2009 | Naijo et al. |
| 2009/0180282 | A1 | 7/2009 | Aylward et al. |
| 2009/0194401 | A1* | 8/2009 | Kim ................ G06F 3/0202 200/314 |
| 2010/0103697 | A1 | 4/2010 | Shimojoh |
| 2010/0208161 | A1 | 8/2010 | Sasaki et al. |
| 2010/0265694 | A1 | 10/2010 | Kim et al. |
| 2010/0321952 | A1 | 12/2010 | Coleman et al. |
| 2011/0038141 | A1 | 2/2011 | Tillin |
| 2011/0051037 | A1 | 3/2011 | Kim et al. |
| 2011/0051044 | A1 | 3/2011 | Segawa |
| 2011/0051397 | A1 | 3/2011 | Bae et al. |
| 2011/0051412 | A1 | 3/2011 | Jeong et al. |
| 2011/0058121 | A1 | 3/2011 | Yabe |
| 2011/0079497 | A1 | 4/2011 | Ng et al. |
| 2011/0141390 | A1 | 6/2011 | Lee et al. |
| 2011/0194034 | A1 | 8/2011 | Shimizu |
| 2012/0140506 | A1 | 6/2012 | Waragawa et al. |
| 2012/0147277 | A1 | 6/2012 | Yamamoto et al. |
| 2015/0036336 | A1* | 2/2015 | Yang ................ G02B 6/0016 362/235 |
| 2016/0284674 | A1* | 9/2016 | Kim ................ F21V 7/0008 |

FOREIGN PATENT DOCUMENTS

| | | |
|---|---|---|
| CN | 101740670 A | 6/2010 |
| CN | 101874179 A | 10/2010 |
| CN | 101988663 A | 3/2011 |
| JP | 09061636 A | 3/1997 |
| JP | 2002108227 A | 4/2002 |
| JP | 2002-324409 A | 11/2002 |
| JP | 2003-222714 A | 8/2003 |
| JP | 2005-100837 A | 4/2005 |
| JP | 2007-011359 A | 1/2007 |
| JP | 2007-287678 A | 11/2007 |
| JP | 2009-193955 A | 8/2009 |
| KR | 10-2001-0041727 A | 5/2001 |
| KR | 10-2007-0060920 A | 6/2007 |
| KR | 10-2007-0068885 A | 7/2007 |
| KR | 10-2007-0081840 A | 8/2007 |
| KR | 10-2008-0050707 A | 6/2008 |
| KR | 10-2011-0022507 A | 3/2011 |
| KR | 10-2012-0003271 A | 1/2012 |
| KR | 10-2012-0003272 A | 1/2012 |
| KR | 10-2012-0003273 A | 1/2012 |
| WO | 2007/064002 A1 | 6/2007 |
| WO | 2007/088797 A1 | 8/2007 |

OTHER PUBLICATIONS

Office Action dated Jan. 16, 2015 in Chinese Application No. 201280027443.9.
Office Action dated Jan. 17, 2017 in Japanese Application No. 2014-503594.
Office Action dated Mar. 13, 2015 in U.S. Appl. No. 14/110,084.
Office Action dated Mar. 8, 2016 in Japanese Application No. 2014-503594.
Office Action dated Apr. 3, 2018 in Chinese Application No. 201510982129.1.
Office Action dated Jul. 9, 2015 in U.S. Appl. No. 14/110,084.
Notice of Allowance dated Oct. 27, 2015 in U.S. Appl. No. 14/110,084.
Office Action dated Aug. 11, 2017 in U.S. Appl. No. 15/056,068.
Notice of Allowance dated Jan. 31, 2018 in U.S. Appl. No. 15/056,068.
Notice of Allowance dated Jul. 23, 2018 in U.S. Appl. No. 15/965,211.
Office Action dated Jul. 23, 2019 in Japanese Application No. 2018-170670.
European Search Report dated Dec. 11, 2019 in European Application No. 19 187 496.5.
Corrected Notice of Allowance dated Jul. 8, 2020 in U.S. Appl. No. 16/165,536.
Notice of Allowance dated Feb. 25, 2020 in U.S. Appl. No. 16/165,536.
Notice of Allowance dated Aug. 18, 2020 in U.S. Appl. No. 16/165,536.
Office Action dated Jun. 18, 2021 in U.S. Appl. No. 16/950,412.
Notice of Allowance dated Sep. 30, 2021 in U.S. Appl. No. 16/950,412.
European Search Report dated Sep. 26, 2022 in European Application No. 22157660.6.
Office Action dated Jun. 6, 2022 in U.S. Appl. No. 17/646,642.
Notice of Allowance dated Oct. 25, 2022 in U.S. Appl. No. 17/646,642.

* cited by examiner

| SAMPLE | | (A) Ag REFLECTIVE Member 1 | (B) Ag REFLECTIVE Member 2 | (C) White PET |
|---|---|---|---|---|
| PATTERN MATERIAL | | - | Silicon | Silicon |
| Line space /Pitch (um) | | - | 300/2000 | 300/2000 |
| Rank | | M3-D42 | M3-D42 | M3-D42 |
| COMPARISON OF LUMINANCE | LUMINANCE | 6605 | 7468 | 8472 |
| | LUMINANCE INCREASE RATE | Ref. | 13% | 28.6% |
| CIE X | | 0.28670 | 0.28658 | 0.28979 |
| CIE Y | | 0.25721 | 0.25685 | 0.26386 |
| PATTERN SHAPE | | | | |

LIGHTING APPARATUS

CROSS-REFERENCE TO RELATED APPLICATIONS

This application is a continuation of U.S. application Ser. No. 18/158,701, filed Jan. 24, 2023; which is a continuation of U.S. application Ser. No. 17/646,642, filed Dec. 30, 2021, now U.S. Pat. No. 11,586,069, issued Feb. 21, 2023; which is a continuation of U.S. application Ser. No. 16/950,412, filed Nov. 17, 2020, now U.S. Pat. No. 11,243,428, issued Feb. 8, 2022; which is a continuation of U.S. application Ser. No. 16/165,536, filed Oct. 19, 2018, now U.S. Pat. No. 10,877,313, issued Dec. 29, 2020; which is a continuation of U.S. application Ser. No. 15/965,211, filed Apr. 27, 2018, now U.S. Pat. No. 10,139,054, issued Nov. 27, 2018; which is a continuation of U.S. application Ser. No. 15/056,068, filed Feb. 29, 2016, now U.S. Pat. No. 9,982,849, issued May 29, 2018; which is a continuation of U.S. application Ser. No. 14/110,084, filed Oct. 4, 2013, now U.S. Pat. No. 9,279,546, issued Mar. 8, 2016; which is the U.S. National Stage application of International Patent Application No. PCT/KR2012/002532, filed Apr. 4, 2012; which claims the benefit under 35 U.S.C. § 119 of Korean Patent Application Nos. 10-2011-0030697, filed Apr. 4, 2011; 10-2011-0070270, filed Jul. 15, 2011; 10-2012-0017280, filed Feb. 21, 2012; and 10-2012-0017282, filed Feb. 21, 2012, the disclosures of each of which are incorporated herein by reference in their entirety.

FIELD OF THE INVENTION

Embodiments of the present invention relate to a lighting apparatus using an LED as a light source, and more particular, to a lighting apparatus having a thin structure that can be applied to interior illumination, lamps for vehicles, backlighting apparatus, and liquid crystal displays.

BACKGROUND ART

A device that performs illumination by guiding light emitted from a light source are required in various ways for lighting lamps, lamps for vehicles, and liquid crystal displays. A technology of making the structure of equipment thin, and a structure that can increase light efficiency are considered as the most important technologies in lighting apparatus.

A liquid crystal display equipped with the lighting apparatus is exemplified and described as follows.

Referring to FIG. 1, in a lighting apparatus 1, a flat light guide plate 30 is disposed on a substrate 20 and a plurality of side type LEDs 10 (only one shown) is arrayed on the sides of the light guide plate 30.

Light L entering the light guide plate 30 from the LEDs 10 is reflected upward from a fine reflection pattern or a reflective sheet 40 under the light guide plate 30 and travels out through the light guide plate 30, such that an LCD panel 50 above the light guide plate is provided with light.

In the structure of the lighting apparatus, as shown in the conceptual view of FIG. 2, a plurality of optical sheets, such as a diffusion sheet 31 or prism sheets 32, 33, or a protective sheet 34, may be further disposed between the light guide plate 30 and the LCD panel 50.

Accordingly, since the light guide plate is basically used as a necessary component in the lighting apparatus, there is a limit in reducing the entire thickness of a product due to the thickness of the light guide plate, and the image quality decreases in a lighting apparatus with a large area.

DETAILED DESCRIPTION OF THE INVENTION

Technical Problem

An embodiment of the present invention is to provide a lighting apparatus that makes it possible to improve the reflectivity and luminance as much as possible and to increase the luminance without increasing the thickness of the lighting apparatus or the number of light sources by being equipped with a reflecting unit having an spaced area on the surface of a printed circuit board, and to increase adjustment of light and a reflective efficiency as large as possible by using a pattern design of a spacer that defines the spaced area.

Another embodiment of the present invention is to provide a reliable product that makes it possible to reduce the number of light sources, decrease the entire thickness of a lighting apparatus, and make the design of the product freer, by removing a light guide plate that is a necessary component in the structure of a common lighting apparatus and implementing a structure that guides light sources by using a film type of resin layer.

Technical Solution

In accordance with an embodiment of the present invention, a lighting apparatus includes: a plurality of LEDs mounted on a printed circuit board; and a reflecting unit stacked on the printed circuit board, with the LEDs through the reflecting unit, in which the reflective unit includes a reflective member containing metal attached to the surface of the printed circuit board or a first reflective member made of white PET (white polyethylen terephthalate); and a transparent second reflective member spaced from the first reflective member and defining the spaced area.

Therefore, it is possible to increase luminance without increasing the thickness of the lighting apparatus or the number of light sources while maximizing improvement of reflectivity and luminance of light by forming the reflecting unit having the spaced area and made of the metal reflective materials and the white PET (white polyethylen terephthalate) on the surface of the printed circuit board, and to maximize the adjustment and reflective efficiency of light by using the pattern design of the spaced member (spacer).

Advantageous Effects

In accordance with the present invention, it is possible to maximize improvement of reflectivity and luminance of light by using a metal reflective unit or white PET (white polyethylen terephthalate) for a reflecting unit having an spaced area on the surface of a printed circuit board, to increase luminance without increasing the thickness of the lighting apparatus or the number of light sources, and to adjust light and maximize the reflective efficiency by using the pattern design of the spaced member (spacer) defining the spaced area.

Further, it is possible to inhibit hot spot and warm portion generated at a light shield pattern portion by defining a spaced area by forming an optical pattern layer having an optical pattern and patterning a bonding material, to implement a lighting apparatus without a difference in optical properties and ensuring reliability between the bonding material and the bonded components, and to accurately align the components.

Further, it is possible to increase diffusion and uniformity of light in the optical properties of the lighting apparatus by disposing a spaced module having a spaced layer patterned on the diffusion member or formed by a specific member.

Further, it is possible to reduce the number of light sources, decrease the entire thickness of the lighting apparatus, and make the design of the product freedom, by removing a light guide plate that is necessary in a common lighting apparatus and guiding light sources with a film type of resin layer.

In particular, it is possible to ensure optical properties while greatly reducing the number of light sources by mounting side type of light emitting diode in a vertical type, apply the lighting apparatus to a flexible display by removing a light guide plate, and ensure a stable emission property by disposing a reflective member including a reflective pattern and a diffusion member including a spaced layer on a resin layer.

DESCRIPTION OF SPECIFIC EMBODIMENTS

Figure 1:
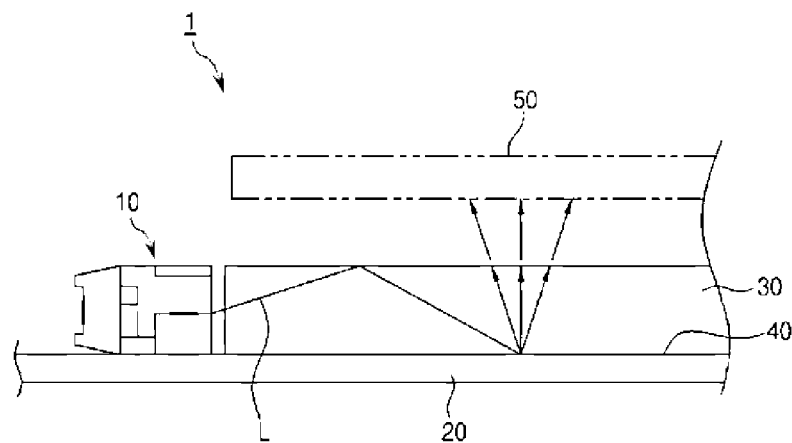
FIGS. 1 and 2 are conceptual views showing the structure of a lighting apparatus of the related art.
Figure 2:
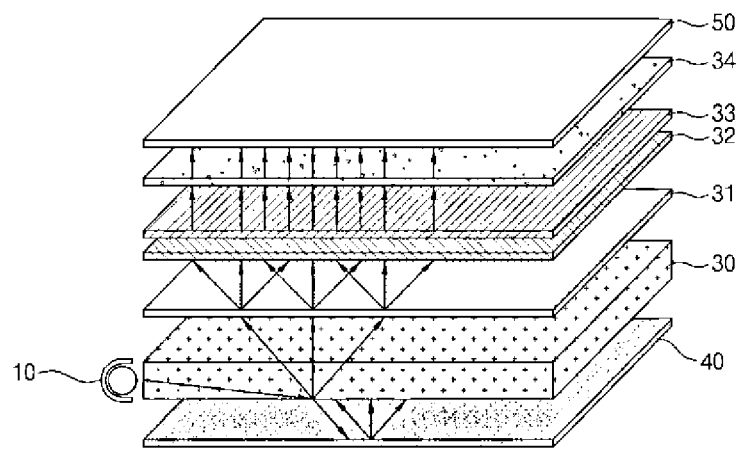

Configuration and operation according to the present invention are described hereafter in detail with reference to the accompanying drawings. In the following description referring to the accompanying drawings, the same components are given the same reference numerals in the figures and the description is not provided. The terms, 'first' and 'second' etc., can be used to describe various components, but the components are not limited to the terms. Terms described in the specification is used to discriminate one component from other components.

The present invention has been designed to improve reflectivity and luminance by disposing a reflecting unit having a spaced area under an LED in a lighting apparatus using the LED as a light source. In particular, in the structure of a lighting apparatus of the related art, the present invention provides a structure that makes it possible to improve optical properties by an optical pattern layer for implementing a spaced area by patterning a bonding material (bonding pattern layer) or a spaced module having a spaced layer by patterning a diffusion member or using a specific member, and particularly, to greatly reduce the entire thickness of the lighting apparatus by removing a light guide plate and forming a resin layer instead of the light guide plate and to reduce the number of light sources.

Further, the lighting apparatus according to the present invention is not limited to a backlighting apparatus of the liquid crystal display described above. That is, the present invention can be obviously applied to various lamps that require lighting, such as lamps for vehicles, home lighting devices, and industrial lighting devices. The lamps for vehicles are obviously the headlight, interior and exterior lamps, and rear light.

1. 1. First Embodiment

Figure 3:
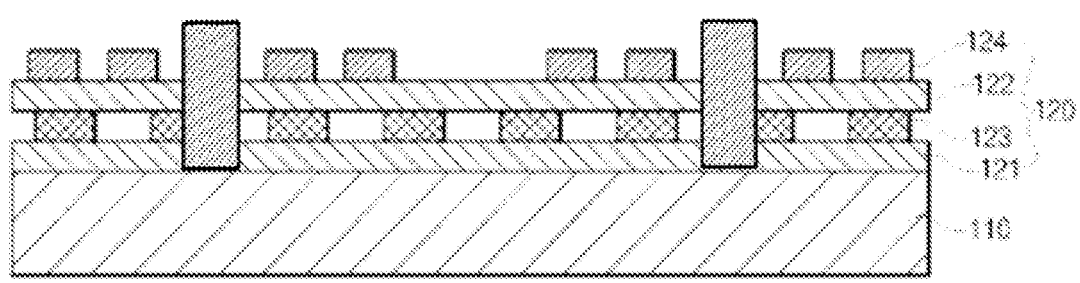
FIG. 3 is a conceptual cross-sectional view showing the main parts of a lighting apparatus according to the present invention.

FIG. 3 is a conceptual cross-sectional view showing the main parts of a lighting apparatus according to the present invention.

Referring to FIG. 3, a lighting apparatus according to the present invention includes a plurality of LEDs 130 disposed on a printed circuit board 110 and a reflecting unit 120 stacked on the printed circuit board 110, with the LEDs 130 through it, on the printed circuit board 110. In particular, a spaced area A1 is defined inside the reflecting unit 120 in this configuration. The spaced area A1 can maximize luminance by increasing the reflective efficiency of light out of the light sources 130.

In particular, the reflecting unit 120 may include a first reflective member 121 attached to the surface of the printed circuit board 110 and a second reflective member 122 made of a transparent material for forming the spaced area A1 and spaced apart from the first reflective member 121. The first and second reflective members 121 and 122 are stacked on the printed circuit board and the LEDs 130 protrude outward through holes formed through the reflective members.

The spaced area A1 makes it possible to form the first and second reflective members 121 and 122 in an integral pressed structure without using a specific adhesive, and as shown in the figure, the first and second reflective members 121 and 122 may be spaced apart from each other to define the spaced area A1 filled with air, by a spaced member 123 such as a specific bonding member.

In this structure, the first reflective member 121 may be a film with a reflective material that reflects light, such as a metal layer made of Ag and the second reflective member 122 is preferably a film made of a transparent material such that the light from the LEDs travels and reflects again from the surface of the first reflective member 122. In particular, the first reflective member 121 is a reflective structure that reflects light, and particularly, the first reflective member 121 is preferably made of white PET (white polyethylen terephthalate) in the present invention. That is, the first reflective member may be implemented by a common metal reflective material layer (Ag etc.) in the specific reflective unit according to the present invention, but white PET (white polyethylen terephthalate) may be used to maximally improve the luminance. It is possible to improve the luminance by about 30% in comparison to the related art, when the first reflective member is made of white PET (white polyethylen terephthalate) to implement the reflecting unit.

In particular, it is further preferable to provide a reflective pattern 124 by printing white on the surface of the second reflective member 122 such that the luminance can be improved by further diffusing light, in addition to allowing the light emitted from the light sources 130 to reflect again from the second reflective member after passing through the first reflective member. A reflective pattern 130 is provided to greatly improve reflectivity of light and may be printed with reflective ink containing any one of $TiO_2$, $CaCO_3$, $BaSO_4$, $Al_2O_3$, Silicon, and PS.

In particular, various light sources may be used for the light sources of the lighting apparatus according to the present invention, and preferably, side emission type of LEDs may be used, in which the reflective pattern is preferable formed in the emission direction of the LEDs and particularly, it may be disposed such that the pattern density increases with the increase in distance from the LEDs in the emission direction. Using the side emission type of LEDs makes it possible to considerably reduce the number of light sources.

Figure 4:
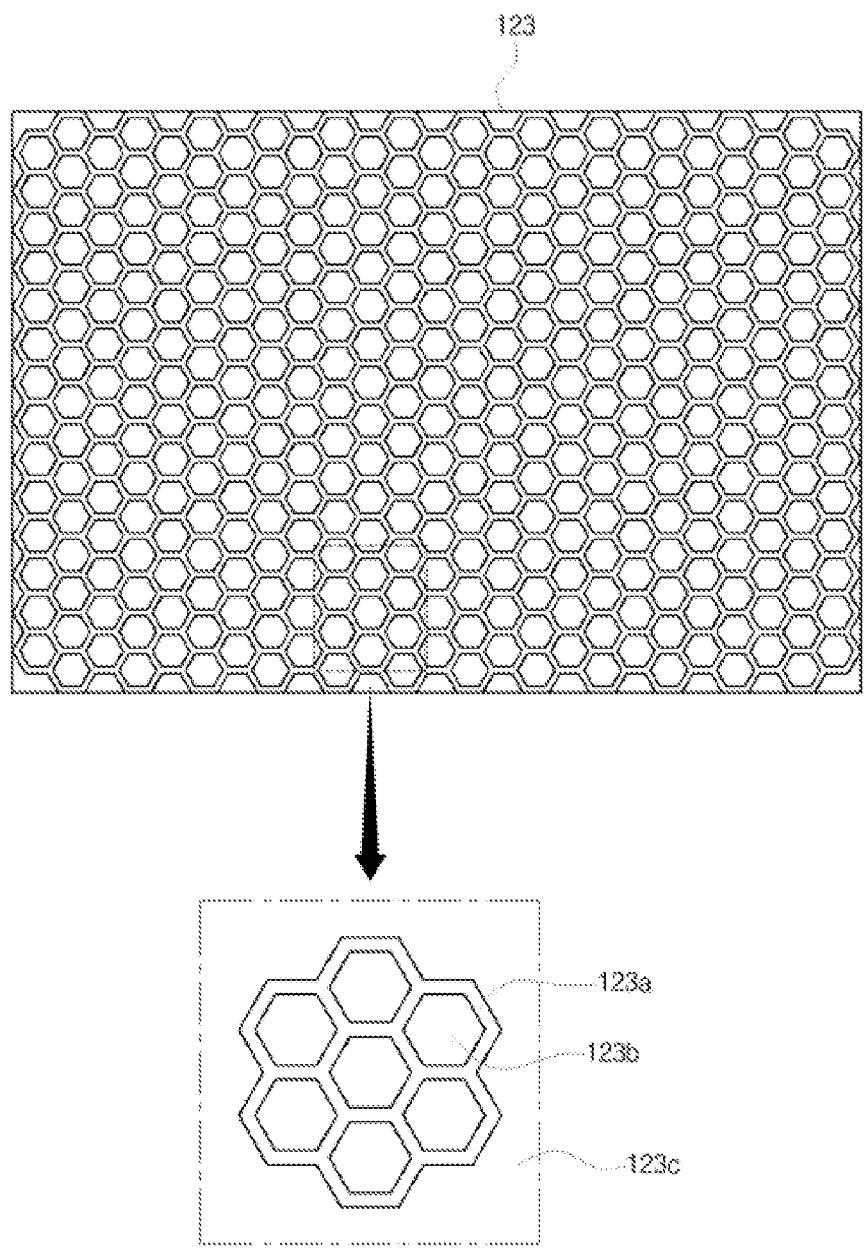
FIG. 4 is a view showing an example of a spaced member of a reflecting unit included in the lighting apparatus of the present invention shown in FIG. 3.

FIG. 4 is a view showing an example of a spaced member of a reflecting unit included in the lighting apparatus of the present invention shown in FIG. 3.

That is, the spaced member according to the present invention may be a common member that defines an spaced area by spacing the first reflective member and the second reflective member, such as a spacer that simply spacing them or an adhesive spacer, but preferably, the spaced member may be formed by uniformly or randomly patterning a structure patterned in the structure shown in FIG. 4 in order to increase a bonding efficiency and efficiently arranging the spaced area.

The spaced member 123 shown in FIG. 4 has hollow unit spaced members 123a and may be implemented in a two- or three-dimensional structure with first spaced portions 123b by the hollow structure of the unit spaced members 123a. That is, the unit spaced member 123a may have various cross-sections such as a polygon, a circle, and an ellipse. The unit spaced members 123 are arranged in contact with each other in the figures, but may be non-uniformly arranged such that second spaced portions 123c which are empty are formed between the unit spaced members 123a, with the first spaced portions 123b of the unit spaced members 123a formed.

Figures 5, 6:
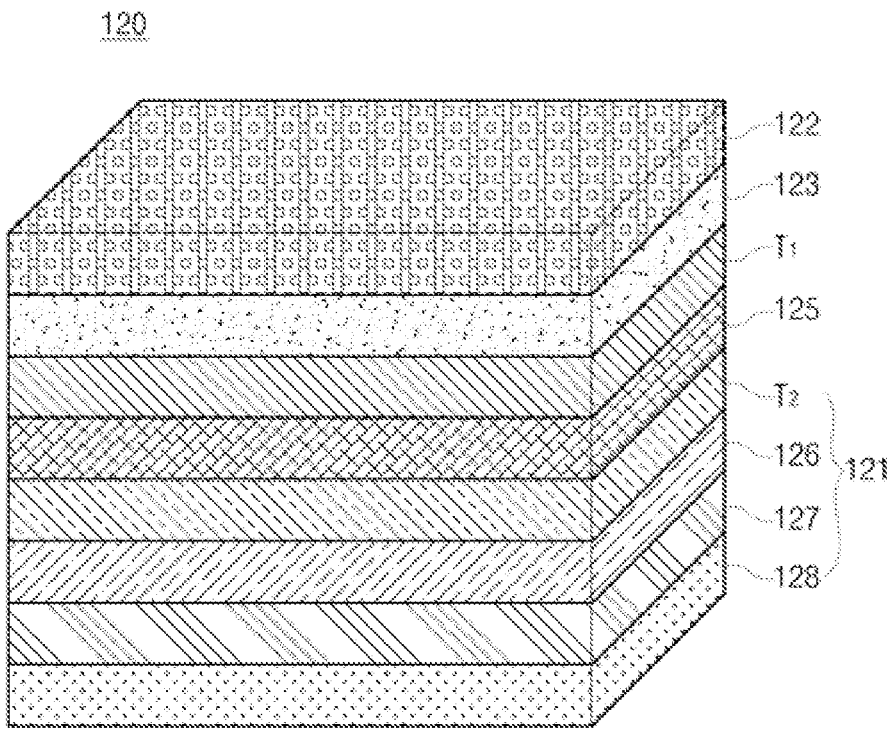
FIG. 5 is a conceptual view showing an example of a reflecting unit according to the present invention.
FIG. 6 is a table showing the result of comparing efficiencies of reflecting unit according to the present invention.

FIG. 5 is a view showing a detailed example of the reflecting unit described in detail with reference to FIGS. 3 and 4. The reflecting unit 120 according to the present invention, as described above, includes the first reflective member attached to the surface of the printed circuit board and the second reflective member 122 spaced from and opposite the first reflective member. In particular, a film made of a transparent material such as PET, or the like, may be used as the second reflective member 122 and the spaced member 123 spacing the first and second reflective members 121 and 122 is formed by patterning a bonding material, thereby defining the spaced area.

In particular, in order to maximize the reflectivity the first reflective member 121 has an optical film 126 bonded by a metal reflective layer 125 that is adhesives (primer) $T_1$ and $T_2$, in which the optical film 126 may also be stacked on a release film 128 through a bonding material (PSA) 127.

In the structure shown in FIG. 5, unlike the embodiment of the first reflective member, the first reflective member 121 may be formed by using white PET (white polyethylen terephthalate) in a reflective structure that reflects light.

FIG. 6 is a table for comparing the degrees of improvement of luminance in a lighting apparatus when the reflecting unit according to the present invention is implemented (CIE X and CIE Y are color coordinates).

(A) in the table shows luminance measured when only one reflective member made of Ag was formed on the printed circuit board in the structure of FIG. 3, (B) shows the resultant value of improvement of luminance, comparing the structure A of the related with the structure of the reflecting unit according to the present invention, that is, when the bonding pattern material was silicon, the pattern of FIG. 4 was formed, and the first reflective member was made of Ag.

Further, (C) shows the resultant value of improvement of luminance compared with the structure of (A) of the related art, when the first reflective member was made of white PET (white polyethylen terephthalate), unlike (B).

According to the measured result, when luminance was 6605 nit in (A), luminance was 7468 nit, about 13% improved in the structure of (B), and for (C) in which the reflecting unit contained white PET (white polyethylen terephthalate) according to the present invention, luminance was 8472 nit, increased by 28.6% in comparison to (A). That is, it is possible to achieve a result of maximizing the luminance when the structure (spaced area) formed by patterning a bonding material layer is formed and white PET (white polyethylene terephthalate) is used.

2. 2. Second Embodiment

Figure 7:
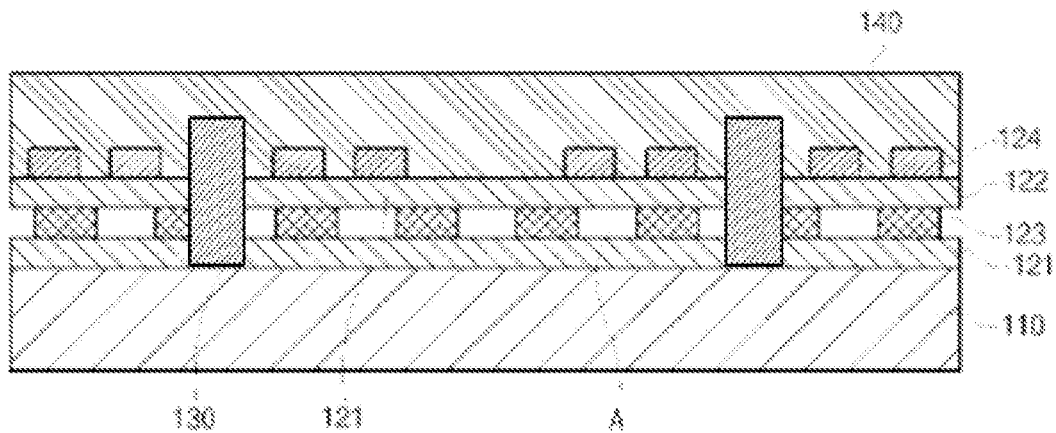
FIG. 7 is a view showing another embodiment of a lighting apparatus according to the present invention.

FIG. 7 is a view showing another embodiment of a lighting apparatus according to the present invention.

That is, the second embodiment according to the present invention implements a structure in which a resin layer is stacked on the printed circuit board of the first embodiment. The configuration of the resin layer corresponds to replacing a light guide plate that is used in a light device of a liquid crystal display and performs a function of guiding light emitted from a light source forward.

Referring to FIG. 7, a lighting apparatus according to the present invention further includes a plurality of LEDs 130 formed on a printed circuit board 110 and a resin layer 140 that diffuses and guides emitted light toward the front.

That is, the resin layer 140 is stacked to surround the LEDs 130 and performs a function of diffusing light emitted to sides from the light sources. That is, the function of a light guide plate of the related art can be performed by the resin layer 140.

Obviously, the resin layer may be basically made of any material as long as the material can diffuse light. For example, according to an embodiment of the present invention, the main material of the resin layer may be resin of which the main material is urethane acrylate oligomer. For example, a substance made by mixing urethane acrylate oligomer that is composite oligomer with a polymer type that is polyacryl. Obviously, a monomer mixed with IBOA (isobornyl acrylate), HPA (Hydroxylpropyl acrylate, or 2-HEA (2-hydroxyethyl acrylate), which is dilutable reactive monomer and a photoinitiator (for example, 1-hydroxy-cyclohexyl phenyl-ketone) or an antioxidant may be mixed, as and additive.

Further, the resin layer 140 may include a light diffuser 141 to increase diffusion and reflection of light. It is preferable to contains the light diffuser of 0.01~0.3 wt % of the entire weight of the resin layer. That is, the light emitted to sides from the LED can be diffused and reflected through the resin layer 140 and the light diffuser 141 and travel upward.

Therefore, it is possible to further increase the reflection together with the reflecting unit 120 according to the present invention. Accordingly, as the resin layer is disposed, it is possible to reduce the entire thickness of the product by greatly decreasing the thickness of the light guide plate of the related art and to provide common usability for flexible displays because ductility is provided.

3. 3. Third Embodiment

The structure of a lighting apparatus according to the third embodiment in which an optical pattern layer that promotes light diffusion is formed on the resin layer is described as a structure improved from the structure of the second embodiment.

Figure 8:
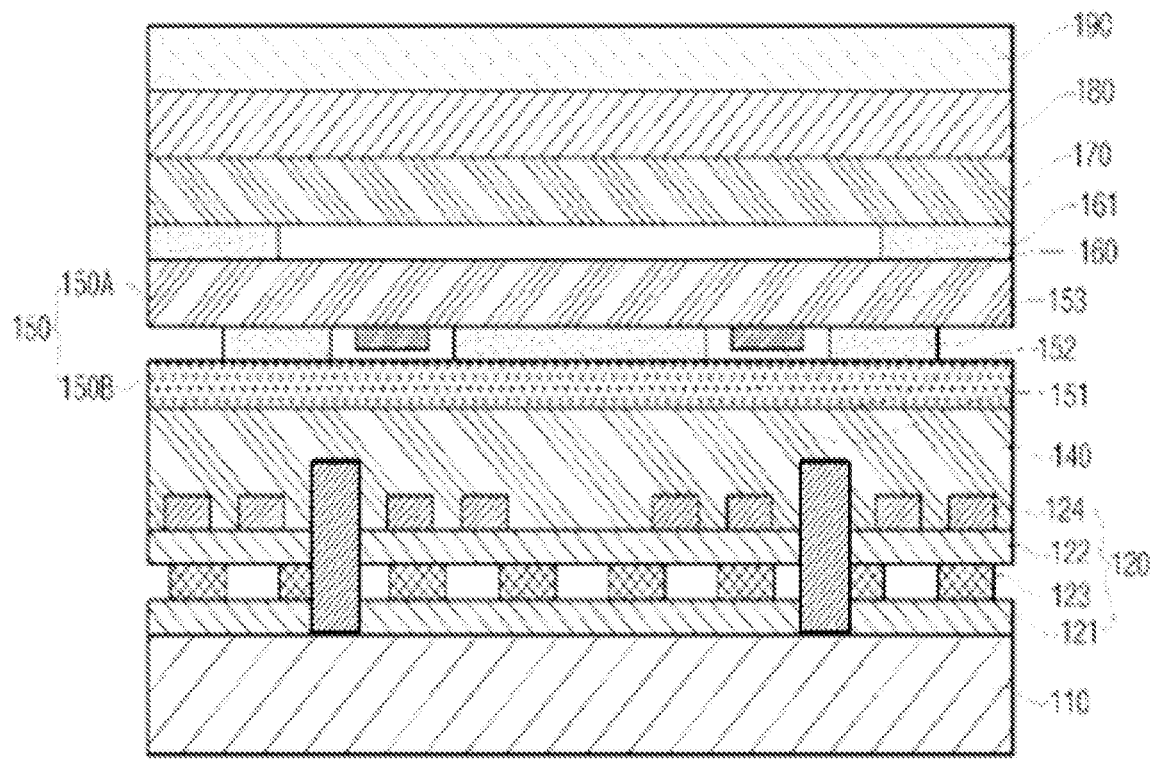
FIG. 8 is a view showing another embodiment of a lighting apparatus according to the present invention.

That is, referring to FIG. 8, a lighting apparatus according to the present invention can be implemented in a structure including an optical pattern layer 150 disposed on the resin layer 140 and having an optical pattern 151 in the structure shown in FIG. 7.

In particular, the optical pattern layer 150 may include a bonding pattern layer 150 defining a second air region 152 surrounding the optical pattern. That is, the bonding pattern layer 153 defines a separate space (second spaced area) having a uniform pattern on the optical pattern 151 and an adhesive is applied to the other portions for bonding.

That is, in the structure shown in the figure, for the arrangement relationship of the optical pattern layer 150 and the bonding pattern layer 153, the optical pattern layer 150 includes a first substrate 150A and a second substrate 150B which include the optical pattern inside them while the bonding pattern layer 153 is applied to the portions other than the second spaced area 152 surrounding the light shield pattern, such that the first substrate 150A and the second substrate 150B are bonded.

That is, the optical pattern 151 may be implemented by a light shield pattern formed to inhibit concentration of light emitted from the LED 130, and for this configuration, it is necessary to align the optical pattern 151 with the LEDs 130, and an adhesive is applied to ensure a fixing force.

The first substrate 150A and the second substrate 150 B may be made of a material having good light transmissivity, for example PET. In this case, the optical pattern 151 disposed between the first substrate 150A and the second substrate 150B basically has a function of inhibiting concentration of light emitted from the LEDs, may be implemented by light shield printing on any one of the first substrate 150A or the second substrate 150B, and the substrates can be bonded and aligned by applying an adhesive to surround the light shield pattern. That is, the structure that bonds the first substrate 150A and the second substrate 150B makes it possible to achieve a function of fixing the printed light shield pattern 151. Further, the bonding layer may be made of, for example, thermoset PSA, a thermoset adhesive, or a UV-curable PSA type material.

When the bonding pattern layer 153 is formed and bonded in a pattern structure for forming the second spaced area 152, strong hot spot or arm portion generated when the bonding material overlaps the light shield pattern can be inhibited, and uniformity of light can be increased by a spaced layer.

The lighting apparatus having the structure described above, according to the present invention, may include a diffusion member 170 on the resin layer 140, in addition to the configuration described above, and may further include an spaced module 160 having a third spaced area 161 between the diffusion member 170 and the optical pattern layer 150. Further, a prism sheet and a protective sheet may be additionally disposed on the diffusion member.

Figure 9A:
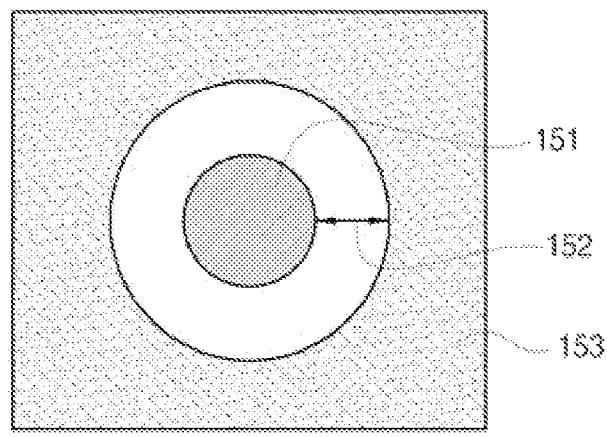
FIGS. 9A-10D are views showing various examples of an optical pattern layer and a diffusion member according to the present invention.
Figure 9B:
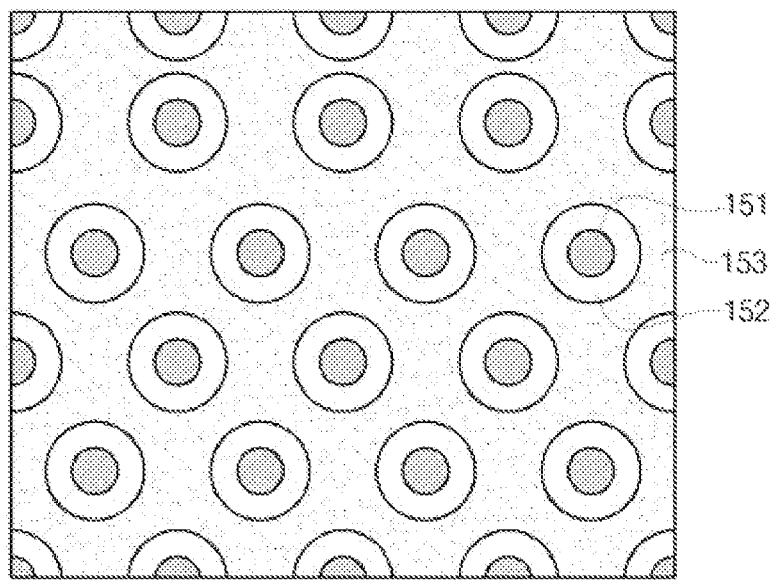

FIGS. 9A-9B are conceptual views showing the configuration of the optical pattern 151 and the bonding pattern layer 153, and the second spaced area 152 defined by them.

When the bonding pattern layer 153 is formed in a structure surrounding the optical pattern 151 printed in a specific pattern on the first substrate by a bonding material, a predetermined separate space is formed and the second substrate 150B is bonded, such that the separated space is closed with a spaced layer, which is defined as the second spaced area. The plane shape of the first spaced area 152 formed by the bonding pattern layer 153 may be implemented in various shapes, such as a circle, an ellipse, a rectangle, a square, and a polygon. Further, the bonding pattern layer may be made of, for example, thermoset PSA, a thermoset adhesive, or a UV-curable PSA type material.

Further, the optical pattern 151 is preferably formed in a light shield pattern to achieve a partial light shield effect in order to inhibit deterioration of optical properties or yellowish of yellow light due to excessive intensity of light. That is, it is possible to print a light shield pattern by using light shield ink such that light is not concentrated.

The optical pattern may be implemented to adjust the degree of blocking light or the degree of diffusion of light in one optical pattern, in order not to completely block light, but partially block and diffuse light. Further, more preferably, the optical pattern according to the present invention may be implemented in an overlap printing structure of a composite pattern. The overlap printing structure is a structure implemented by forming one pattern and printing another pattern shape thereon.

For example, the optical pattern 151 may be implemented in an overlap printing structure of a diffusion pattern formed by light shield ink containing any one or more selected from $TiO_2$, $CaCO_3$, $BaSO_4$, $Al_2O_3$, and Silicon on the underside of a macromolecular film in the emission direction of light and a light shied pattern using light shield ink containing Al or a mixture of Al and $TiO_2$. That is, a double structure may be possible to form a diffusion pattern on the surface of a macromolecular film by white printing and then forming a light shield pattern thereon, or in the opposite order. Obviously, the design of the pattern may be changed in various ways in consideration of the efficiency and intensity of light, and the light shield rate. Alternatively, a triple structure may be possible by forming a light shield pattern, which is a metal pattern at the middle layer in a sequentially stacked structure, and forming a diffusion pattern on and under the light shield pattern. It is possible to implement the triple structure by selecting the materials, and a preferred example is to implement one of diffusion patterns by using $TiO_2$ having high a high refractive index and implement the other diffusion pattern by using $CaCO_3$ and $TiO_2$ which has high optical stability and tone, such that it is possible to ensure efficiency and uniformity of light by using the triple structure that implements a light shield pattern by using Al that is easily covered. In particular, $CaCO_3$ finally implements white light by reducing exposure of yellow light such that more stable light having high efficiency can be implemented, and inorganic materials having a similar structure, in which the particle size is large, such as $BaSO_4$, $Al_2O_3$, and Silicon light diffusers, may be used, other than $CaCO_3$. Further, it is preferable to form the optical pattern by adjusting pattern density such that pattern density decreases as it becomes far from the LED in the emission direction in terms of light efficiency.

Further, the inhibit invention may further include an spaced module disposed between the optical pattern layer 150 and the diffusion member 170.

FIGS. 10A-10D are views showing an example of forming the spaced module disposed between the optical pattern layer 150 and the diffusion member 170 shown in FIG. 8.

That is, according to the configuration of the lighting apparatus according to the present invention, it is possible to add a structure having a spaced layer (third spaced area 160) between the optical pattern layer 150 and the diffusion member 170 and to achieve an effect that diffuses light emitted from the light source and improve uniformity of the light by using the third spaced area 160. Further, it is preferable to make the third spaced area 160 0.01~2 mm thick in order to minimize a difference of the light passing through the resin layer 140 and the optical pattern layer 150.

The third spaced area 160 may be formed by a structure in which a spaced layer can be formed under the diffusion member and it is determined as an "air gap module", including the third spaced area implemented by the structure.

The spaced module includes both a method of implementing a spaced area (spaced layer) by machining the diffusion member and a configuration of forming a spaced area by forming a specific structure under the diffusion member.

Figure 10A:
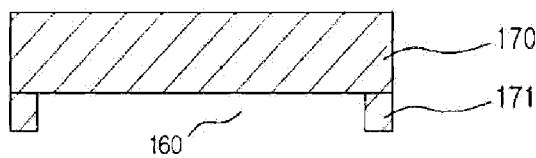
Figure 10B:
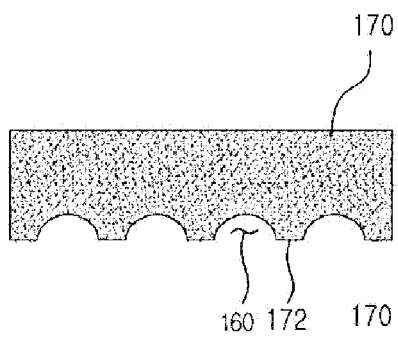

That is, as shown in FIG. 10A, the third spaced area 160 may be implemented by forming a spacer 171 under the diffusion member 170, or as shown in FIG. 10B, the third spaced area 160 may be implemented in the structure of a bridge 172 by patterning the lower portion of the diffusion member and attaching it to the lower layer.

The integral structure may be modified in various ways in accordance with the patterned shape, that is, the pattern of forming the spaced area, and accordingly the shape of the bridge may be modified in various ways, which is also included in the spirit of the present invention. Further, as in the structure shown in FIG. 10C, it may be implemented in a structure of forming the spaced area 160 by using a specific structure, other than the method of patterning the underside of the diffusion member. Obviously, the structure is a structure of forming the bridge 174 with a spacer member and the spirit of the present invention includes this method, such that various modified examples that can implement a spaced layer under the diffusion member also correspond to the spirit of the present invention.

Figure 10C:
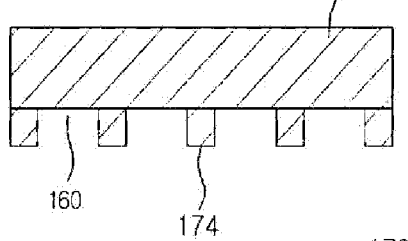
Figure 10D:
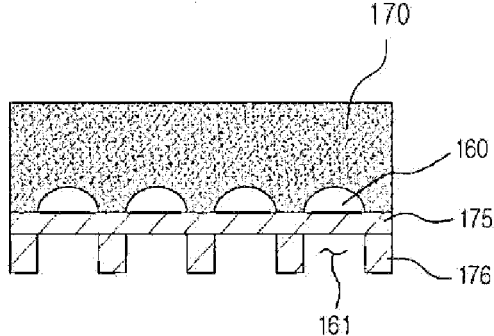

As shown in FIG. 10D, similar to the configuration of FIG. 10B that patterns the diffusion member or the configuration of FIG. 10C that uses a specific structure, it may be possible to form the spaced areas 160 and 161 in a plurality of layers by using the structures 175 and 176 that can implement independent spaced layers.

The lighting apparatus according to the present invention can be applied to an LCD by the following configuration and operation. In the lighting apparatus according to the present invention, the LEDs 130 may be side emission type of LEDs.

Referring to FIG. 8, light is emitted to sides from the side emission type of LED 130, the emitted light is reflected and diffused by the resin layer 140 formed instead of a light guide plate of the related art, the light is inhibited from being concentrated by the optical pattern layer 150, and a difference o flight can be minimized by the third spaced area formed under the diffusion member. In particular, the reflectivity can be further improved by the reflecting unit 120 according to the present invention which is disposed between the resin layer 140 and the printed circuit board 110, such that efficiency of light can be maximized and luminance can be improved. In particular, in the reflecting unit 120 according to the present unit, it is possible to adjust the reflectivity by varying the design for implementing the spaced areas by patterning the bonding material layer while it is possible to implement different reflectivity and colors in accordance with the type. Further, it is possible to adjust the reflectivity in accordance with the optical property and thickness of the second reflective member 122.

Consequently, the reflective efficiency of the light from the reflecting unit 120 and the reflective pattern 124 according to the present invention increases, such that it is possible to guide the light forward. The light passing through the resin layer 140, as described above, is diffused or blocked by the optical pattern 151 formed on the optical pattern layer 150 and the optical property of the refined light is refined again through the spaced module formed under the diffusion member, such that the uniformity can be increased, and the light travels into the LCD panel in white light through the optical sheets, such as the additional prism sheet 180 and the DBEF 190.

As described above, it is possible to maximize the reflective efficiency by the structure having the spaced areas of the reflecting unit in the lighting apparatus according to the present invention, and to reduce the thickness and the number of light sources by removing the structure f a light guide plate, applying side emission type of LEDs for the light sources, and guiding light to be diffused and reflected by the resin layer. Meanwhile, it is possible to improve optical properties by making it possible to control reduction of luminance and uniformity due to the decrease of the light sources by using the reflective pattern, the light shield pattern, and the spaced areas of the spaced module.

The detailed embodiments of the present invention were described above. However, it is possible to modify the present invention in various ways without departing from the scope of the present invention. The scope of the present invention should not be construed as being limited to the embodiments described above, but determined by equivalents to claims, in addition to claims.

INDUSTRIALLY AVAILABILITY

The present invention according to the present invention can be applied to various lamps that require lighting, such as lamps for vehicles, home lighting devices, and industrial lighting devices. The lamps for vehicles are obviously the headlight, interior and exterior lamps, and rear light.

The invention claimed is:
1. A lighting apparatus comprising:
a substrate;
a light source disposed on the substrate and including a plurality of light emitting elements;
a reflective unit disposed on the substrate;
a resin layer disposed on the reflection unit and covering the light source; and
an optical pattern layer disposed on the resin layer,
wherein the reflective unit includes a first film, a second film spaced apart from the first film, a spacer disposed between the first film and the second film, and a plurality of first spaced areas formed within the spacer,
wherein the first film and the second film include a plurality of holes through which each of the plurality of light emitting elements passes,
wherein the optical pattern layer includes a first transparent film disposed on the resin layer, a second transparent film disposed spaced apart from the first transparent film, and a plurality of light blocking patterns disposed between the first transparent film and the second transparent film, and
wherein a number of the plurality of first spaced areas is greater than a number of the plurality of light blocking patterns.
2. The lighting apparatus of claim 1, wherein the optical pattern layer includes a plurality of second spaced areas disposed around the plurality of light blocking patterns.
3. The lighting apparatus of claim 1, wherein a number of the plurality of light blocking patterns is the same as a number of the plurality of light emitting elements.

4. The lighting apparatus of claim 1, wherein a number of the plurality of second spaced areas is the same as a number of light emitting devices.

5. The lighting apparatus of claim 4, wherein the plurality of second spaced areas are disposed to surround a periphery of the light blocking pattern.

6. The lighting apparatus of claim 4, wherein the plurality of second spaced areas are regularly arranged.

\* \* \* \* \*